(12) United States Patent
Holbein et al.

(10) Patent No.: US 11,999,315 B2
(45) Date of Patent: Jun. 4, 2024

(54) SAFETY BELT SYSTEM AND METHOD FOR DETERMINING THE BELT STRAP EXTENSION BY MEANS OF A SAFETY BELT SYSTEM

(71) Applicant: ZF AUTOMOTIVE GERMANY GMBH, Alfdorf (DE)

(72) Inventors: Wolfgang Holbein, Alfdorf (DE); David Reich, Berglen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 807 days.

(21) Appl. No.: 17/056,780

(22) PCT Filed: Jun. 3, 2019

(86) PCT No.: PCT/EP2019/064258
§ 371 (c)(1),
(2) Date: Nov. 19, 2020

(87) PCT Pub. No.: WO2019/233911
PCT Pub. Date: Dec. 12, 2019

(65) Prior Publication Data
US 2021/0122328 A1    Apr. 29, 2021

(30) Foreign Application Priority Data
Jun. 7, 2018   (DE) .................... 10 2018 113 582.3

(51) Int. Cl.
*B60R 22/48*   (2006.01)
(52) U.S. Cl.
CPC ...... *B60R 22/48* (2013.01); *B60R 2022/4825* (2013.01)
(58) Field of Classification Search
CPC .............. B60R 22/48; B60R 2022/485; B60R 2022/4825
See application file for complete search history.

(56) References Cited

U.S. PATENT DOCUMENTS

| 6,425,541 | B1 | 7/2002 | Strobel |
| 7,868,572 | B2 * | 1/2011 | Odate ..................... B60R 22/46 318/434 |

(Continued)

FOREIGN PATENT DOCUMENTS

| DE | 10332534 | 2/2005 |
| DE | 102004019375 | 12/2005 |

(Continued)

*Primary Examiner* — Sang K Kim
(74) *Attorney, Agent, or Firm* — TAROLLI, SUNDHEIM, COVELL & TUMMINO L.L.P.

(57) ABSTRACT

A seatbelt system for a vehicle comprises a webbing (28), a belt retractor, a belt reel (16) and a belt reel angle sensor (22) having a first gearwheel assembly (32) and a second gearwheel assembly (36). The belt reel angle sensor (22) includes a multi-stage gearing (58) having a first gear stage with a first reduction ratio and a second gear stage with a second reduction ratio. The belt reel angle sensor (22) further comprises a rotation angle sensor (64) and a rotation angle transmitter (34) associated with the rotation angle sensor (64) as well as a reference signal sensor (68) and a reference signal transmitter (38) associated with the reference signal sensor (68). The rotation angle transmitter (34) is associated with the first gearwheel assembly (32) and the reference signal transmitter (38) is associated with the second gearwheel assembly (36). Relative to the reference signal sensor (68), the second gearwheel assembly (36) has a parking position, a base position and a reference position at which the reference signal transmitter (38) generates a reference signal in the reference signal sensor (68). Moreover, a method for determining the webbing extension by means of such seatbelt system is described.

20 Claims, 5 Drawing Sheets

(56) References Cited

U.S. PATENT DOCUMENTS

| 7,891,596 B2 * | 2/2011 | Holbein | B60R 22/46 |
| | | | 242/382.4 |
| 8,844,667 B2 * | 9/2014 | Odate | B60R 22/48 |
| | | | 180/270 |
| 2002/0079397 A1 | 6/2002 | Snyder | |

FOREIGN PATENT DOCUMENTS

| DE | 102005042307 | 3/2007 |
| DE | 102006037735 | 2/2008 |

* cited by examiner

SAFETY BELT SYSTEM AND METHOD FOR DETERMINING THE BELT STRAP EXTENSION BY MEANS OF A SAFETY BELT SYSTEM

RELATED APPLICATIONS

This application corresponds to PCT/EP2019/064258, filed Jun. 3, 2019, which claims the benefit of German Application No. 10 2018 11 3 582.3, filed Jun. 7, 2018, the subject matter of which are incorporated herein by reference in their entirety.

BACKGROUND OF THE INVENTION

The invention relates to a seatbelt system for a vehicle comprising a controller, a belt webbing and a belt retractor that includes a belt reel arranged for winding up the belt webbing. Further, the invention relates to a method for determining the webbing extension by means of such seatbelt system.

Up-to-date seatbelt systems are equipped, in addition to the common webbing-sensitive and/or vehicle-sensitive blocking functions, with additional functions. One of said additional functions is the detection of a buckled condition to which end the unwound webbing length, i.e. the webbing extension, is detected.

In order to determine the webbing extension, usually webbing extension sensors or belt reel angle sensors are employed. They show the drawback, however, that in the case of low voltage they do no longer work properly so that e.g. after power failure the belt reel angle sensor needs to be re-calibrated.

SUMMARY OF THE INVENTION

Therefore, it is the object of the invention to provide a novel seatbelt system that works more reliably and is especially insensitive to power failure. It is another object of the invention to provide a system for determining the webbing extension by means of such seatbelt system.

For achieving the object, a seatbelt system for a vehicle comprising a controller, a belt webbing and a belt retractor is provided. The belt retractor includes a belt reel provided for winding up the webbing and a belt reel angle sensor connected to the controller so as to transmit signals. The belt reel angle sensor comprises a first gearwheel assembly having a first gearwheel and a second gearwheel which is coupled to the first gearwheel so as to transmit torque. Furthermore, the belt reel angle sensor includes a second gearwheel assembly having teeth. The first gearwheel is coupled to a pinion associated with the belt reel, especially with the axis of rotation of the belt reel, in such a way that a first gear stage with a first reduction ratio is formed, i.e. the transmission or reduction ratio i is less than 1. The second gearwheel is coupled to the teeth so that a second gear stage with a second reduction ratio is formed. Thus, the driven side of the first gear stage is coupled to the driving side of the second gear stage. Moreover, the belt reel angle sensor comprises a rotation angle sensor and a rotation angle transmitter associated with the rotation angle sensor as well as a reference signal sensor and a reference signal transmitter associated with the reference signal sensor. Accordingly, the rotation angle transmitter is associated with the first gearwheel assembly and the reference signal transmitter is associated with the second gearwheel assembly. The second gearwheel assembly is adjustable relative to the reference signal sensor and includes a parking position, a base position and a, particularly single, reference position, the reference signal transmitter at the reference position generating or triggering a reference signal in the reference signal sensor.

The parking position is associated with the position of the belt reel at which the webbing extension is minimum when the seatbelt system is opened, i.e. at which the belt is provided with tight belt webbing for extension. The base position is associated with the position of the belt reel at which the webbing extension is minimum when the seatbelt system is closed, i.e. at which the seatbelt and, resp., the belt webbing tightly contacts an infinitesimally slim person or an unoccupied seat of the vehicle.

The parking position and the base position may vary, for example depending on the position of the seat, if the latter is adjustable relative to the seatbelt system.

In the seatbelt system according to the invention, two gear stages are applied. At the first gear stage, a relative belt reel angle corresponding to the rotation of the belt reel can be detected by means of the rotation angle transmitter in combination with the rotation angle sensor. As the webbing extension is not proportional to the rotation of the belt reel, for detecting the absolute webbing extension it is necessary to know the range within which the belt reel is rotated and the webbing was withdrawn or wound up. By means of the reference signal generated at the reference position, the absolute position of the belt reel and thus the range in which the webbing extension has been implemented can be determined. Thus, the reference signal serves for calibrating the belt reel angle sensor. In this way, the actual absolute webbing extension can be determined based on said two pieces of information, viz. the relative belt reel angle and the absolute position of the belt reel. By calibrating the belt reel angle sensor via the reference signal when detecting the webbing extension, the webbing extension can be determined by means of the seatbelt system in a reliable and precise manner, even after power failure.

Preferably, the reference position is disposed following the parking position, especially between the parking position and the base position, so as to ensure the reference signal to be generated during each buckling up and thus the belt reel angle sensor to be calibrated.

In one embodiment, the second gearwheel assembly is rotatably supported relative to the reference signal sensor, the angle between the parking position and the reference position and/or the base position being less than 180°, preferably less than 90°, especially less than 60°. This allows to ensure the range for said positions on the second gearwheel assembly to be small and the entire range from the parking position to the fully extended position at which the webbing is completely unwound and extended to be depicted on the circumference of the second gearwheel assembly without more than one rotation of the second gearwheel group being required. This means that the entire belt reel revolutions can be reduced to a maximum of one revolution of the second gearwheel assembly.

The first reduction ratio may be provided to be less than the second reduction ratio.

It is advantageous when the first reduction ratio is at least $\frac{1}{3}$, at least $\frac{1}{5}$, especially at least $\frac{1}{10}$ to safeguard small reduction and thus a large number of rotations at the first gearwheel. This causes the rotation angle transmitter to rotate more frequently, and the belt reel angle is measured by means of the rotation angle sensor with higher precision as there will be more tooth flank changes.

The second reduction ratio may be at most $\frac{1}{2}$, at most $\frac{1}{3}$, especially at most $\frac{1}{4}$ so as to safeguard high reduction so that adjustment of the second gearwheel group is only relatively little during a belt extension.

According to one embodiment, the reduction ratio of the multi-stage gearing formed by the first gear stage and the second gear stage is at most $\frac{1}{10}$, at most $\frac{1}{15}$, especially at most $\frac{1}{20}$. In this way, during a belt extension the second gearwheel assembly is adjusted to a relatively small extent only. In particular, in this way complete extension of the belt webbing which usually entails about a dozen of rotations of the belt reel can be ensured to be reduced to a maximum of one revolution of the second gearwheel assembly.

According to another embodiment, the belt retractor comprises a locking side assembly in which the belt reel angle sensor is integrated. Thus, the belt retractor and, resp., the seatbelt system can exhibit a compact design.

The seatbelt system may further be provided to be designed so that the webbing extension between the parking position and a fully extended position at which the belt webbing is completely unwound or extended results in a total rotation angle of the belt reel that is larger than 360°, preferably larger than 1800°, further preferred larger than 3600°. This means that for completely winding the belt webbing off the belt reel from the parking position more than one, preferably more than five, further preferred more than ten revolutions of the belt reel are required. Thus, the webbing extension results in a corresponding number of revolutions of the pinion associated with the belt reel without a gear stage being necessary at this position, i.e. the pinion may be arranged directly on the belt reel axle, thereby allowing the belt retractor and the seatbelt system to be designed in an especially compact and inexpensive manner. Such moderate number of revolutions is favorable as it results in correspondingly many tooth flank changes of the first gearwheel and, consequently, in higher precision of the measurement of the belt reel angle by means of the rotation angle sensor.

In accordance with the invention, for achieving the aforementioned object also a method for determining the webbing extension by means of a seatbelt system according to the invention is provided. The method comprises the following steps:
a) The reference signal is used to calibrate the belt reel angle sensor by assigning a reference value at the reference position to the belt reel, and
b) the change of position of the belt reel relative to the reference position is detected by means of the rotation angle sensor and therefrom the absolute webbing extension is determined.

For example, the reference value is zero or any value corresponding to the webbing extension at the reference position and defines the absolute position of the belt reel. The change of position of the belt reel here is the change of the angular position of the belt reel about its axis of rotation, i.e. of its rotation angle.

BRIEF DESCRIPTION OF THE DRAWINGS

Further advantages and features will be evident from the following description in combination with the attached drawings, wherein.

DESCRIPTION

Figure 1:
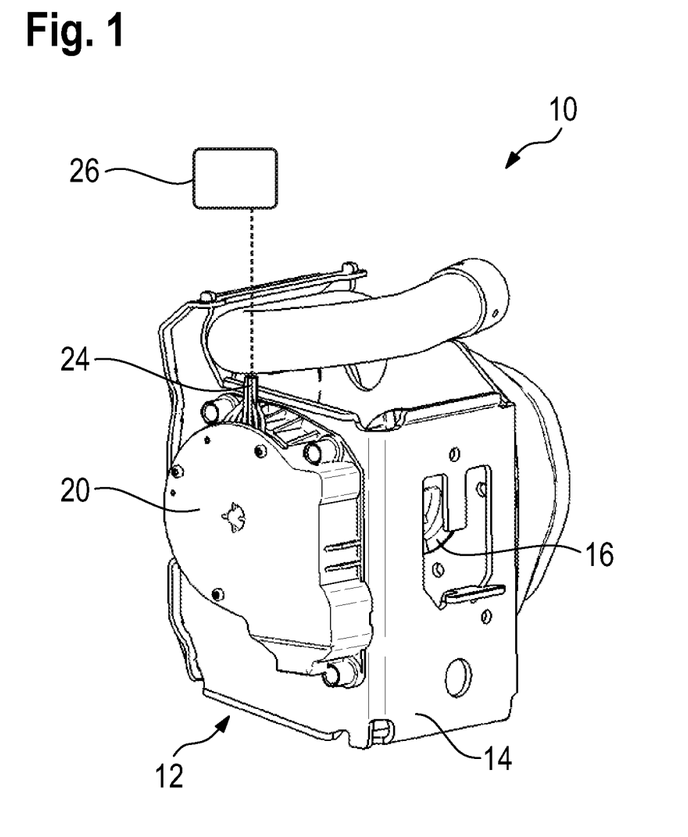
FIG. 1 shows a perspective view of a seatbelt system according to the invention (without belt webbing) that comprises a belt retractor having a locking side assembly.

FIG. 1 illustrates a seatbelt system 10 for a vehicle.

The vehicle is, for example, a passenger car or a truck and comprises a seat on which a person can be buckled up by means of the seatbelt system 10. In an alternative embodiment, the vehicle may be any vehicle that is especially provided for passenger transport.

Figure 3:
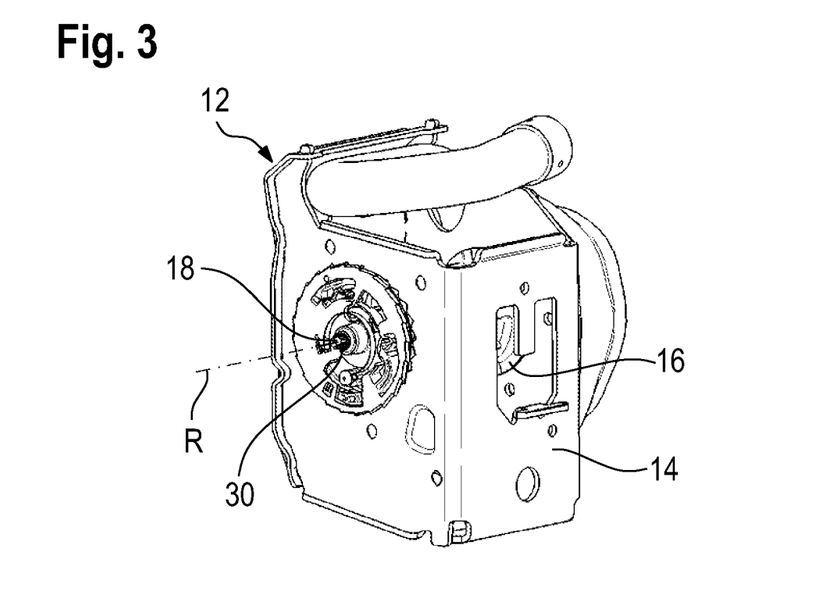
FIG. 3 shows a perspective view of the belt retractor from FIG. 1 without a locking side assembly.

The seatbelt system 10 comprises a belt retractor 12 having a housing 14 in which a belt reel 16 is rotatably supported about its belt reel axle 18 (see FIG. 3), as well as a locking side assembly 20 which is provided at an axial end of the belt reel 16 on the housing 14 and is arranged for blocking the belt reel 16 in a known way.

In the locking side assembly 20 (see FIG. 2) a belt reel angle sensor 22 is integrated which is connected via an electric line 24 to transmit signals and to a controller 26 (see FIG. 1) of the seatbelt system 10.

In an alternative embodiment, especially in a belt retractor 12 without a locking side assembly 20, the belt reel angle sensor 22 may be provided at any position of the belt retractor 12. The position at an axial end of the belt reel 16 is preferred, as in this way a compact structure can be ensured.

In the present case, the controller 26 is the on-board computer of the vehicle. As a matter of course, the controller 26 of the seatbelt system 10 may alternatively be part of a controller of another system present in the vehicle or a separate controller 26.

Alternatively, or additionally to the electric line 24, the belt reel angle sensor 22 may be wirelessly connected to the controller 26 to transmit signals.

The seatbelt system 10 further comprises a belt webbing 28 (see FIG. 4) provided for restraining the person buckled up by the seatbelt system 10. The belt webbing 28 is fixed to the belt reel 16 so that the belt webbing 28 is wound onto or off the belt reel 16 when the belt reel 16 rotates about its belt reel axle 18.

Figure 12:
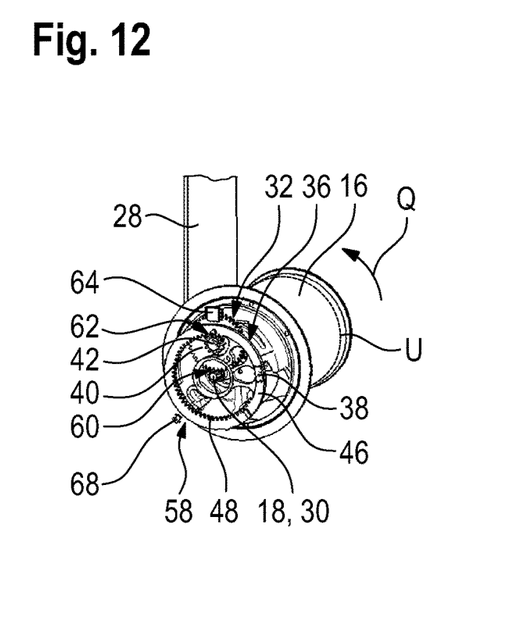
FIG. 12 shows a perspective view of the belt reel angle sensor from FIG. 2 and the belt reel including belt webbing from FIG. 4 at the fully extended position.

The belt reel 16 has a reel circumference U (see FIG. 12) and the belt webbing 28 has a length such that the belt reel 16 performs 15 revolutions when the webbing 28 is extended from a parking position (see FIG. 6) to the fully extended position (see FIG. 12). In an alternative embodiment, the ratio of the circumference U of the belt reel 16 to the length of the webbing 28 may be configured so that an extension of the webbing 28 from the parking position to the fully extended position results in at least one, preferably at least five, especially at least ten complete revolutions of the belt reel 16.

At the end of the belt reel 16 facing the locking side assembly 20, the belt reel axle 18 includes a pinion 30 (cf. FIG. 3) that is coupled to the belt reel axle 18 to transmit a torque.

The belt reel angle sensor 22 comprises a first gearwheel assembly 32 (cf. FIG. 4) including a rotation angle transmitter 34 as well as a second gearwheel assembly 36 including a reference signal transmitter 38.

The first gearwheel assembly 32 includes a large first gearwheel 40 and a small second gearwheel 42 (see FIG. 6) that is connected to the first gearwheel 40 in a coaxial and torque-transmitting manner.

Figure 4:
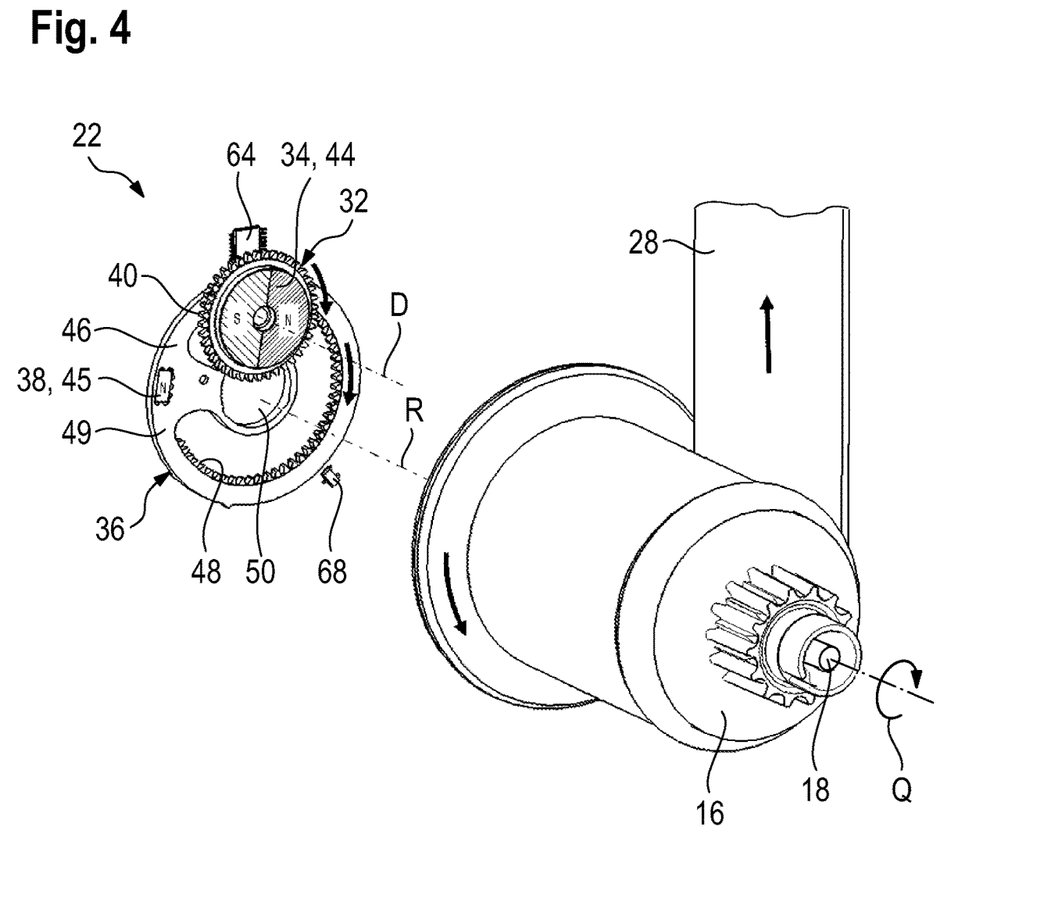
FIG. 4 shows an exploded view of the belt reel angle sensor from FIG. 2 and a belt reel including belt webbing of the belt retractor from FIG. 1.

The rotation angle transmitter 34 is formed by a magnet 44 integrated in the first gearwheel 40 (see FIG. 40).

The poles of the magnet 44 are provided on halves of the first gearwheel 40 disposed to be radially opposed so that, upon rotation of the first gearwheel 40, the magnetic field will change sinusoidally.

In an alternative embodiment, the rotation angle transmitter 34 may have any design and/or may be provided at any position in the first gearwheel assembly 32.

Figure 2:
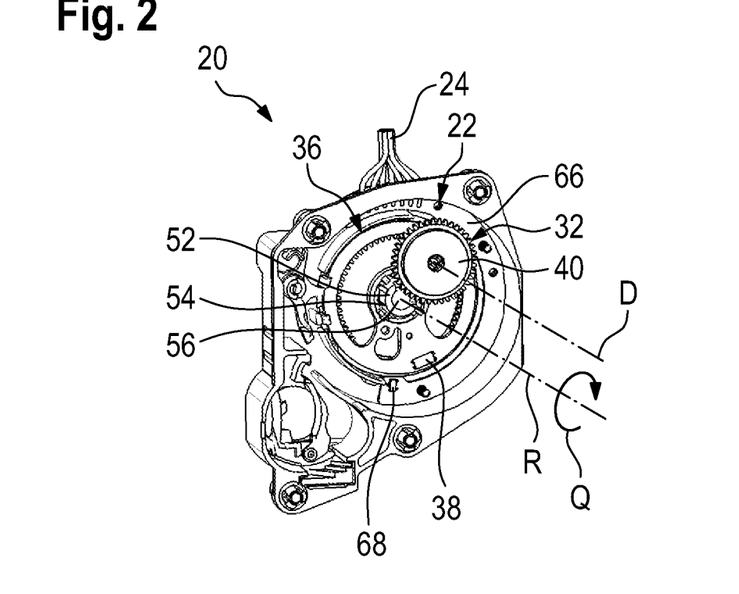
FIG. 2 shows a perspective view of the locking side assembly from FIG. 1 with an integrated belt reel angle sensor.

The first gearwheel assembly 32 is supported in the locking side assembly 20 to be rotatable about its axis of rotation D (see FIG. 2).

The second gearwheel assembly 36 is formed by a circular disk 46 having internal teeth 48. The internal teeth 48 extend in the circumferential direction Q of the axis of rotation R at an angle of about 270° about the axis of rotation R of the second gearwheel assembly 36.

The reference signal transmitter 38 is formed by another magnet 45 disposed in the radially outer edge area 49 on the disk 46.

Generally, the reference signal transmitter 38 may have any design and/or may be provided at any position in the second gearwheel assembly 36.

In an alternative embodiment, the second gearwheel assembly 36 may have any design, especially the circular disk 46 may include external teeth rather than internal teeth 48. In addition, or as an alternative, the teeth 48 may in any case extend over any angle.

The second gearwheel assembly 36 is supported in the locking side assembly 20 to be rotatable about its axis of rotation R, the axis of rotation R of the second gearwheel assembly 36 coinciding with the axis of rotation of the belt reel axle 18 so that the second gearwheel assembly 36 is arranged coaxially to the belt reel axle 18.

Accordingly, the second gearwheel assembly 36 includes a circular central opening 50 (see FIG. 4) through which a sleeve-type journal 52 (see FIG. 2) of the locking side assembly 20 extends in the axial direction of the axis of rotation R. The radial outer circumferential surface 54 of the journal 52 forms the bearing on which the second gearwheel assembly 36 is supported to be rotatable about the axis of rotation R, while the cylindrical recess 56 in the sleeve-type journal 52 forms a bearing in which the belt reel axle 18 is rotatably supported about the axis of rotation R.

In an alternative embodiment, the journal 52 may form no bearing for the belt reel axle 18, and the belt reel axle 18 can merely extend into the recess 56 which in this case may have any design. In another alternative embodiment, the journal 52 may have no recess 56, wherein, in this case, the belt reel axle 18 ends in the axial direction ahead of the journal 52.

The belt reel 16 forms, together with the belt reel angle sensor 22, a multi-stage gearing 58 (see FIG. 6) having a first gear stage 60 and a second gear stage 62.

The first gear stage 60 is formed by the pinion 30 and the first gearwheel 40 which are toothed with each other to transmit a torque.

The second gear stage 62 is formed by the second gearwheel 42 and the second gearwheel assembly 36, the second gearwheel 42 being toothed with the second gearwheel assembly 36 via the internal teeth 48 to transmit a torque.

The first gear stage 60 has a first reduction ratio of 1:5 and the second gear stage 62 has a second reduction ratio of 1:3. Thus, the multi-stage gearing 58 has a total reduction ratio of 1:15.

As a matter of course, the first and second gear stages 60, 62 and consequently also the multi-stage gearing 58 may show other reduction and transmission ratios. Especially, the first reduction ratio may be at least 1:3, preferably at least 1:5, further preferred at least 1:10, and/or the second reduction ratio may be at most 1:2, preferably at most 1:3, further preferred at most 1:4. Furthermore, the total reduction ratio may be especially at most 1:10, preferably at most 1:15, further preferred at most 1:20.

The individual gear stages 60, 62 as well as the multi-stage gearing 58 may, of course, comprise further gear members, especially further gearwheels.

In another embodiment, further gear stages may further be provided in addition to the first and second gear stages 60, 62, thus the multi-stage gearing 58 correspondingly being a gearing with three or more gear stages.

For detecting the rotation angle of the first gearwheel assembly 32, the belt reel angle sensor 22 comprises a rotation angle sensor 64.

The rotation angle sensor 64 is arranged at the housing 66 of the locking side assembly 20 on the side of the first gearwheel 40 arranged to be opposed to the belt reel 16 in the axial direction facing the first gearwheel 40.

Accordingly, the rotation angle sensor 64 and the rotation angle transmitter 34 are arranged so that the rotation angle transmitter 34 generates a signal in the rotation angle sensor 64 from which the position of the rotation angle of the first gearwheel 40 can be determined in the known way.

The rotation angle sensor 64 in this case is a Hall sensor detecting the magnetic field changes of the rotating magnet 44.

Moreover, the belt reel angle sensor 22 comprises a reference signal sensor 68 which is fixed, radially facing the reference signal transmitter 38, to the housing 66 of the locking side assembly 20.

The reference signal sensor 68 and the reference signal transmitter 38 are arranged such that the reference signal transmitter 38 triggers a reference signal in the reference signal sensor 68 when the distance A between the reference signal transmitter 38 and the reference signal sensor 68 is minimum.

In this case, the reference signal sensor 68 is a Hall sensor detecting the magnetic field of the reference signal transmitter 38 and generating the reference signal in the case of maximum magnetic field intensity.

In an alternative embodiment, the rotation angle sensor 64 and/or the reference signal sensor 68 may show any design and/or any arrangement.

In FIG. 4, the functioning of the multi-stage gearing 58 is shown. When the belt webbing 28 is extended and thus wound off the belt reel 16, the belt reel 16 rotates contrary to the circumferential direction Q. This rotation of the belt reel 16 is transmitted via the first gear stage 60 to the first gearwheel assembly 32, there resulting in an appropriately reduced rotation of the first gearwheel 40 in the circumferential direction Q. The second gearwheel assembly 36 is driven by the first gearwheel assembly 32 by means of the second gear stage 62 and, being appropriately reduced, is rotated in the circumferential direction Q. When the belt webbing 28 is wound up by means of the belt reel 16, the directions of rotation of the components and, resp., assemblies are appropriately reversed.

In an alternative embodiment in which the gear stages 60, 62 are designed differently, the direction of rotation of the individual components and/or assemblies may deviate from the shown embodiment.

The seatbelt system 10 is installed in the vehicle such that, during operation, it adopts the positions illustrated in FIGS. 5 to 12.

Figure 5:
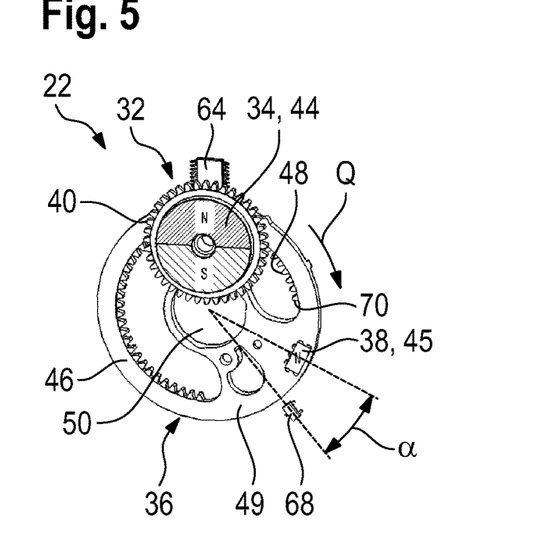
FIG. 5 shows a back view of the belt reel angle sensor from FIG. 2 at a parking position.
Figure 6:
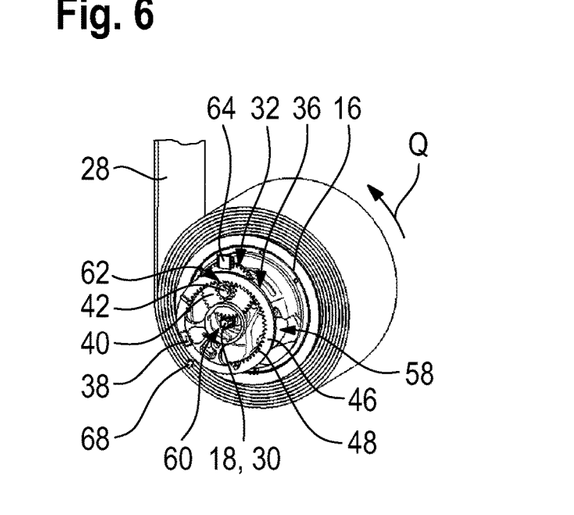
FIG. 6 shows a perspective view of the belt reel angle sensor from FIG. 2 and the belt reel including belt webbing from FIG. 4 at the parking position.

FIGS. 5 and 6 illustrate the parking position at which the seatbelt is opened and the belt webbing 28 is tensioned and ready for extension. At this position, the belt webbing 28 is wound onto the belt reel 16 as far as this is possible during operation. If the seatbelt is a belt in which the webbing 28 is not guided via a deflecting member, such as in a simple two-point lap belt, at this position the webbing 28 may be completely wound up on the belt reel 16. If, however, the seatbelt is a belt in which the webbing 28 is provided via a deflecting member, for example a classic three-point seatbelt, there remains a portion of the webbing 28 which, during operation, is always wound off the belt reel 16.

Basically, the belt retractor 12 may be designed such that the webbing 28 can be completely wound up by the belt reel 16, for example for mounting or logistics purposes. In the present embodiment, this is ensured by the fact that between the stop 70 formed by one end of the internal teeth 48 and the second gearwheel 42 there is sufficient space left so that the second gearwheel assembly 36 can rotate contrary to the circumferential direction Q, when the belt reel 16 completely winds up the webbing 28 without being restrained by the stop 70.

At the parking position, the second gearwheel assembly 36 is at a posture at which the reference signal transmitter 38 is arranged in the circumferential direction Q ahead of the reference signal sensor 68, with the angle α between the reference signal transmitter 38 and the reference signal sensor 68 amounting to −25°.

Figure 7:
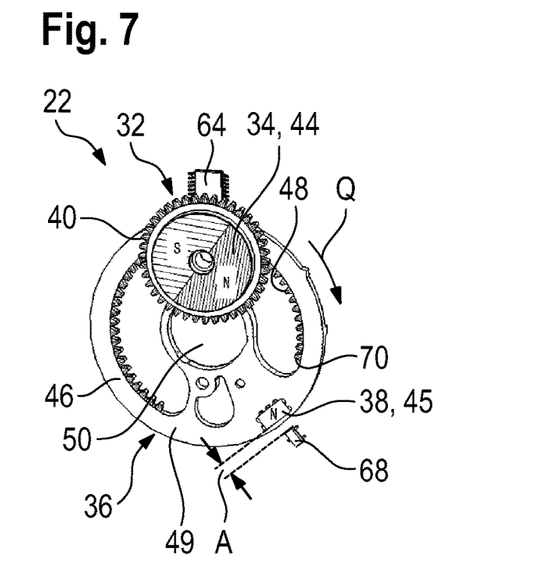
FIG. 7 shows a back view of the belt reel angle sensor from FIG. 2 at a reference position.
Figure 8:
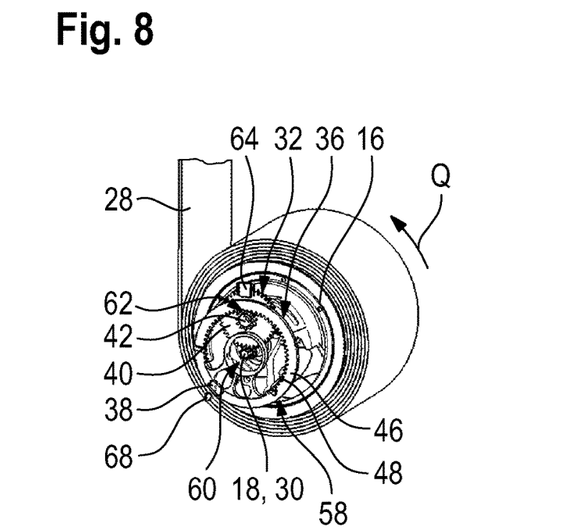
FIG. 8 shows a perspective view of the belt reel angle sensor from FIG. 2 and the belt reel including belt webbing from FIG. 4 at the reference position.

FIGS. 7 and 8 illustrate the reference position at which part of the webbing 28 is wound off the belt reel 16 and thus the second gearwheel assembly 36 is adjusted vis-à-vis the parking position in the circumferential direction Q.

At the reference position, the angle α between the reference signal transmitter 38 and the reference signal sensor 68 amounts to 0° so that the distance A between the reference signal transmitter 38 and the reference signal sensor 68 is minimum and the reference signal is generated.

Figure 9:
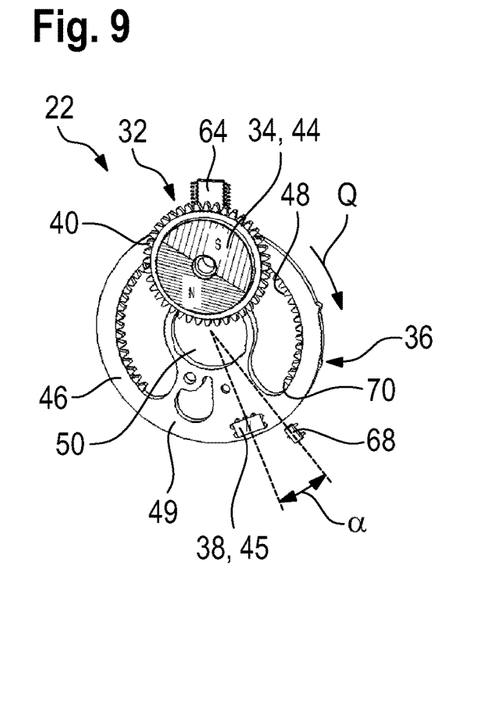
FIG. 9 shows a back view of the belt reel angle sensor from FIG. 2 at a base position.
Figure 10:
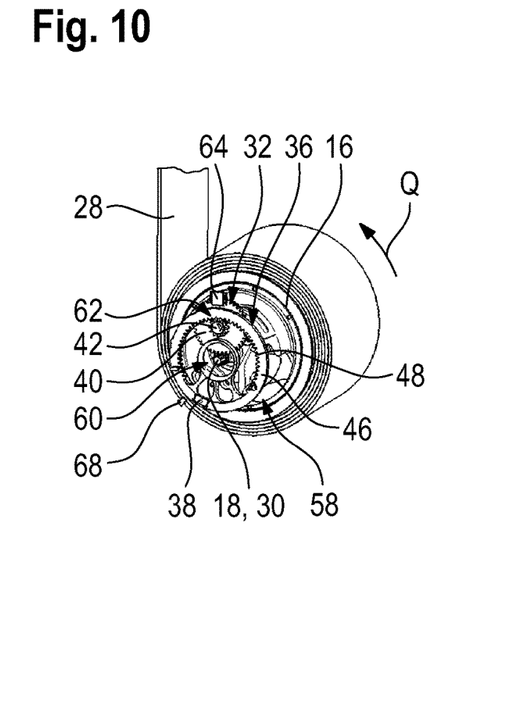
FIG. 10 shows a perspective view of the belt reel angle sensor from FIG. 2 and the belt reel including webbing from FIG. 4 at the base position.

FIGS. 9 and 10 show a base position at which the webbing 28 is wound off the belt reel 16 just sufficiently that the seatbelt is closed in the case of an unoccupied seat or an extremely slim person.

As compared to the reference position, the second gearwheel assembly 36 is adjusted by 15° in the circumferential direction Q. This means that the angle α between the reference signal transmitter 38 and the reference signal sensor 68 amounts to 15°.

Figure 11:
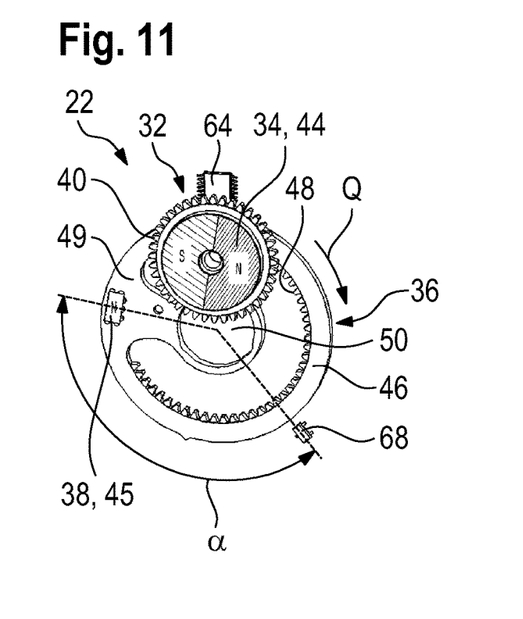
FIG. 11 shows a back view of the belt reel angle sensor from FIG. 2 at a fully extended position.

In FIGS. 11 and 12, the fully extended position at which the webbing 28 is completely wound off the belt reel 16 is shown.

At this position, the angle α between the reference signal transmitter 38 and the reference signal sensor 68 amounts to 135°.

In this way, the angle α between the parking position and the reference position amounts to 25°, and the angle α between the parking position and the base position amounts to 40°.

In an alternative embodiment, the angles α between the individual positions (parking position, reference position, base position, fully extended position) may be of any amount. Especially, the angle α between the parking position and the reference position may amount to less than 180°, preferably less than 90°, further preferred less than 60°. Further, the angle α between the parking position and the base position may amount to less than 180°, preferably less than 90°, further preferred less than 60°.

During buckling up when a person who is not infinitesimally slim buckles up by means of the seatbelt system within the vehicle, the webbing 28 is extended and the belt reel 16 is adjusted from the parking position to a buckling position which is located between the base position and the fully extended position based on the person's size. Accordingly, the first gearwheel 40 rotates proportionally to the belt reel 16 corresponding to the first reduction. At the same time, the second gearwheel assembly 36 is adjusted from the parking position to the buckled position in the circumferential direction Q, wherein the second gearwheel assembly 36 passes through the reference position and a reference signal is generated.

In order to determine the webbing extension, i.e. the length of the belt webbing 28 which, during the buckling operation, is wound off the belt reel 16 from the parking position to the buckling position, the relative change of the rotation angle of the belt reel 16 is detected by means of the rotation angle sensor 64 during the buckling operation, i.e. the number of the revolutions of the belt reel 16.

In addition, the reference signal is used to define the absolute posture of the belt reel 16 by assigning a predetermined reference value that corresponds to the actual rotation angle posture of the belt reel 16 at this position to the belt reel 16 at the reference position. In this way, the belt reel angle sensor 22 is calibrated by means of the reference signal.

From the relative change of the rotation angle of the belt reel 16, the absolute webbing extension is determined by the controller 26 by means of the reference signal defining the absolute angular range in which the rotation of the belt reel 16 has been carried out during the buckling operation.

In the shown embodiment, the reference position defines a posture of the belt reel 16 at which the latter has a total rotation angle of 3600° vis-à-vis the fully extended position. This means, when the belt reel 16 reaches the reference position, the belt reel 16 has completed exactly ten full revolutions vis-à-vis the fully extended position. During the buckling operation, the relative change of the rotation angle of the belt reel amounts to 700°, for example, wherein the reference position is reached with a relative change of rotation angle of 200°. Thus, it is a fact that the webbing extension has been performed in the absolute range of from 3400° (=3600°−200°) to 4100° (=3600°−200°+700°). Based on the known function of the webbing extension deposited in the controller 26 depending on the absolute rotation angle of the belt reel 16, an absolute webbing extension now can be assigned to the range of from 3400° to 4100°.

By calibrating the belt reel angle sensor 22 at the reference position during a buckling operation, there is provided a seatbelt system 10 by which the webbing extension can be reliably determined and which is especially insensitive to power failures.

Further, the belt reel angle sensor 22 exhibits higher precision, as compared to a sensor in which the total belt reel revolutions are reduced to one revolution of the rotation angle transmitter, as the lower first reduction ratio results in more revolutions of the rotation angle transmitter 34 and, consequently, to more tooth flank changes.

The belt reel angle sensor 22 moreover can be used as a relative sensor.

The seatbelt system 10 has an especially compact design and includes a small number of components.

In addition, the seatbelt system 10 is close to a "true power on" system.

The invention is not limited to the illustrated embodiments. In particular, individual features of one embodiment may be included, independently of the other features of the corresponding embodiment, in another embodiment according to the invention which is not shown, i.e. the aforedescribed features can be combined at will.

The invention claimed is:

1. A seatbelt system (10) for a vehicle, comprising a controller (26), a belt webbing (28) and a belt retractor (12) which includes a belt reel (16) arranged for winding up the belt webbing (28) and a belt reel angle sensor (22) connected to the controller (26) to transmit signals,
   wherein the belt reel angle sensor (22) includes a first gearwheel assembly (32) having a first gearwheel (40) and a second gearwheel (42) coupled to the first gearwheel (40) as well as a second gearwheel assembly (36) having teeth (48),
   wherein a pinion (30) associated with the belt reel (16) is coupled to the first gearwheel (40) such that a first gear stage (60) having a first reduction ratio is formed,
   wherein the second gearwheel (42) is coupled to the teeth (48) such that a second gear stage (62) having a second reduction ratio is formed,
   wherein the belt reel angle sensor (22) comprises a rotation angle sensor (64) and a rotation angle transmitter (34) associated with the rotation angle sensor (64) as well as a reference signal sensor (68) and a reference signal transmitter (38) associated with the reference signal sensor (68),
   wherein the rotation angle transmitter (34) is associated with the first gearwheel assembly (32) and the reference signal transmitter (38) is associated with the second gearwheel assembly (36),
   wherein, relative to the reference signal sensor (68), the second gearwheel assembly (36) has a parking position, a base position and a reference position at which the reference signal transmitter (38) generates a reference signal in the reference signal sensor (68).

2. The seatbelt system according to claim 1, wherein reference position is disposed following the parking position, especially between the parking position and the base position.

3. The seatbelt system according to claim 1, wherein the second gearwheel assembly (36) is rotatably supported relative to the reference signal sensor (68), wherein the angle (α) between the parking position and the reference position and/or the base position is less than 180°.

4. The seatbelt system according to claim 3, wherein the angle (α) between the parking position and the reference position and/or the base position is less than 60°.

5. The seatbelt system according to claim 1, wherein the first reduction ratio is lower than the second reduction ratio.

6. The seatbelt system according to claim 1, wherein the first reduction ratio amounts to at least 1/10.

7. The seatbelt system according to claim 1, wherein the second reduction ratio amounts to at most 1/2.

8. The seatbelt system according to claim 1, wherein the reduction ratio of the multi-stage gearing (58) formed by the first gear stage (60) and the second gear stage (62) amounts to at most 1/10.

9. The seatbelt system according to claim 1, wherein the belt retractor (12) comprises a locking side assembly (20), the belt reel angle sensor (22) being integrated in the locking side assembly (20).

10. The seatbelt system according to claim 1, wherein the seatbelt system (10) is configured such that the webbing extension between the parking position and a fully extended position at which the webbing (28) is completely extended results in a rotation angle of the belt reel (16) that is more than 360°.

11. A method for determining the webbing extension by means of a seatbelt system (10) according to claim 1, comprising the following steps:
   the reference signal is used to calibrate the belt reel angle sensor (22) by assigning a reference value to the belt reel (16) at the reference position, and
   the change of position of the belt reel (16) relative to the reference position is detected by means of the rotation angle sensor (64).

12. The seatbelt system according to claim 1, wherein the reference position is disposed between the parking position and the base position.

13. The seatbelt system according to claim 1, wherein the first reduction ratio amounts to at least 1/3.

14. The seatbelt system according to claim 1, wherein the first reduction ratio amounts to at least 1/5.

15. The seatbelt system according to claim 1, wherein the second reduction ratio amounts to at most 1/3.

16. The seatbelt system according to claim 1, wherein the second reduction ratio amounts to at most 1/4.

17. The seatbelt system according to claim 1, wherein the reduction ratio of the multi-stage gearing (58) formed by the first gear stage (60) and the second gear stage (62) amounts to at most 1/15.

18. The seatbelt system according to claim 1, wherein the reduction ratio of the multi-stage gearing (58) formed by the first gear stage (60) and the second gear stage (62) amounts to at most 1/20.

19. The seatbelt system according to claim 1, wherein the seatbelt system (10) is configured such that the webbing extension between the parking position and a fully extended position at which the webbing (28) is completely extended results in a rotation angle of the belt reel (16) that is more than 1800°.

20. The seatbelt system according to claim 1, wherein the seatbelt system (10) is configured such that the webbing extension between the parking position and a fully extended position at which the webbing (28) is completely extended results in a rotation angle of the belt reel (16) that is more than 3600°.

* * * * *